United States Patent
Fujimoto et al.

(10) Patent No.: US 6,888,645 B1
(45) Date of Patent: May 3, 2005

(54) COLOR IMAGE FORMING APPARATUS

(75) Inventors: Osamu Fujimoto, Yamatokoriyama (JP); Hideo Matsuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/551,965

(22) Filed: Apr. 19, 2000

(30) Foreign Application Priority Data

May 7, 1999 (JP) .......................................... 11-127723

(51) Int. Cl.⁷ ............................. G06F 15/00; G06K 1/00
(52) U.S. Cl. ..................... 358/1.9; 358/3.28; 358/501; 358/518; 358/2.1; 399/299; 399/2; 399/67; 399/71; 399/108.1; 399/108.6; 399/108.7; 399/360
(58) Field of Search ................... 358/1.9, 3.28, 358/501, 518, 2.1; 399/299, 2, 67, 71, 108.1, 108.6, 108.7, 360

(56) References Cited

U.S. PATENT DOCUMENTS

| | | | |
|---|---|---|---|
| 4,095,888 A | * 6/1978 | Kawazu et al. | 399/178 |
| 5,115,281 A | * 5/1992 | Ohtsuka et al. | 399/16 |
| 5,257,119 A | 10/1993 | Funada et al. | 358/438 |
| 5,465,161 A | 11/1995 | Funada et al. | 358/438 |
| 5,561,500 A | * 10/1996 | Ohzeki et al. | 399/85 |
| 5,568,285 A | * 10/1996 | Ikeda | 358/518 |
| 5,585,912 A | * 12/1996 | Shin et al. | 399/178 |
| 5,610,688 A | * 3/1997 | Inamoto et al. | 399/366 |
| 5,729,785 A | * 3/1998 | Sakaizawa et al. | 399/2 |
| 5,737,100 A | 4/1998 | Funada et al. | 358/501 |
| 5,742,408 A | * 4/1998 | Funada et al. | 358/501 |
| 5,930,572 A | * 7/1999 | Haneda et al. | 399/309 |
| 6,148,158 A | * 11/2000 | Amemiya | 399/39 |
| 6,240,271 B1 | * 5/2001 | Shimazawa et al. | 399/299 |

FOREIGN PATENT DOCUMENTS

| | | |
|---|---|---|
| JP | 60-225174 | 11/1985 |
| JP | 2-12273 | 1/1990 |
| JP | 04-204871 | 7/1992 |
| JP | 4-204871 | 7/1992 |
| JP | 04-221974 | 8/1992 |
| JP | 04-284468 | 10/1992 |
| JP | 09-174946 | 7/1997 |
| JP | 09-204086 | 8/1997 |
| JP | 10-031342 | 2/1998 |
| JP | 10-177286 | 6/1998 |
| JP | 11-098345 | 4/1999 |
| JP | 11-109708 | 4/1999 |
| JP | 11-122470 | 4/1999 |
| JP | 11-212328 | 8/1999 |

OTHER PUBLICATIONS

Japanese Office Action mailed Nov. 4, 2003 and English Translation.

* cited by examiner

*Primary Examiner*—Mark Wallerson
*Assistant Examiner*—Michael Burleson
(74) *Attorney, Agent, or Firm*—David G. Conlin; David A. Tucker; Edwards & Angell, LLP

(57) ABSTRACT

A color image forming apparatus of the present invention is, for example, a digital color copying machine arranged to include two image processing units (first and second image processing units) each having a photosensitive body. The first image processing unit forms a monochrome image and the second image processing unit forms a particular pattern or a trace pattern. According to this arrangement, the particular pattern or trace pattern can be added to a monochrome image while maintaining a printing rate as fast as a monochrome image printing rate. Consequently, an additional information of a color other than black can be combined with a monochrome image at the same printing rate as the monochrome image printing rate, thereby making it possible to provide a compact and inexpensive apparatus.

25 Claims, 3 Drawing Sheets

COLOR IMAGE FORMING APPARATUS

FIELD OF THE INVENTION

The present invention relates to a color image forming apparatus capable of forming an image based on image information, and more particularly, to a color image forming apparatus capable of forming an image by superimposing additional data.

BACKGROUND OF THE INVENTION

An image forming apparatus which forms a composite image of a monochrome image with additional information of a particular pattern has been known. The particular pattern referred to herein means a color pattern superimposed on a monochrome copy image of a monochrome original read by a reading scanner, and more precisely, color companies logs and texts exhibiting the nature of documents, such as "CONFIDENTIAL" and "URGENT".

Another type of image forming apparatus which forms a composite image of a color image with additional information of a pattern image (trace pattern), that is, identification information identifying a particular device, has been also known. This type of image forming apparatus was devised to prevent forgery of particular kinds of images including securities, paper money, etc. by an abuse of today's sophisticated image forming apparatus capable of forming high-quality color images, such as a color copying machine and a color printer. The trace pattern is superimposed on a copy image in an almost unnoticeable color to human eyes, for example, yellow.

Techniques related to the foregoing color image forming apparatuses are disclosed in, for example, Japanese Patent No. 2614369 effected on May 28, 1997 (U.S. Pat. No. 5,257,119 effected on Oct. 26, 1993, U.S. Pat. No. 5,465,161 effected on Nov. 7, 1995, U.S. Pat. No. 5,737,100 effected on Apr. 7, 1998, and U.S. Pat. No. 5,472,408 effected on Apr. 21, 1998) etc.

On the other hand, a color image forming apparatus, such as a color copying machine and a color printer, is chiefly divided into two types: one adopts a multi-rotation process method and the other adopts a tandem method.

A color image forming apparatus adopting the multi-rotation process method includes one photosensitive body, and four developing devices withholding yellow, magenta, cyan and black toners are driven sequentially in association with the rotation of the photosensitive body. Therefore, by this method, a color image is formed by repeating an image forming process four times in total.

In case of forming a monochrome image, the multi-rotation process method is advantageous over the tandem method in that adaptation to compact apparatuses, a shorter printing time, and improved throughput (the number of copies per unit time). On the other hand, in case of forming a color image, the multi-rotation process method has a problem that not only the print time is extended, but also the throughput is reduced.

Meanwhile, a color image forming apparatus adopting the tandem method includes four image forming stations, each comprising a photosensitive body and a developing device withholding toner of one of four colors: yellow, magenta, cyan and black. Therefore, by this method, a color image is formed by driving each image forming station separately.

In case of forming a full-color image, the tandem method can attain high throughput compared with the multi-rotation process method. However, in case of forming a monochrome image, the throughput is reduced compared with the multi-rotation process method because a paper has to travel a longer transportation path. As to the tandem method, an arrangement to increase a processing rate and hence a printing rate only when forming a monochrome image has been proposed.

The tandem method has another problem that, because image forming process devices, such as a charger and a laser scanner unit, have to be provided to each image forming station, the size and costs of the apparatus as a whole are increased undesirably.

Further, a compact and inexpensive color image forming apparatus including two photosensitive bodies has been developed. This type of color image forming apparatus can attain higher throughput than the one adopting the multi-rotation process method when making color image copies, and also can attain higher throughput than the one adopting the tandem method when making monochrome copy images.

As to the foregoing color image forming apparatus including two photosensitive bodies (hereinafter, referred to as double-photosensitive-body method), techniques disclosed in the following publications (a) and (b) have been known.

(a) Japanese Laid-open Patent Application No. 12273/1990 (Japanese Official Gazette, Tokukaihei No. 2-12273, publishing date: Jan. 17, 1990)

According to the technique disclosed in this publication, an image of a first color and an image of a second color are formed respectively on two photosensitive bodies, and transferred sequentially onto a paper attracted to a transfer drum. Then, an image of a third color and an image of a fourth color are formed respectively on the two photosensitive bodies, and transferred sequentially onto the paper attracted to the transfer drum, whereby a color image is formed on the paper.

(b) Japanese Laid-open Patent Application No. 204871/1992 (Japanese Official Gazette, Tokukaihei No. 4-204871, publishing date: Jul. 27, 1992), and Japanese Laid-open Patent Application No. 177286/1998 (Japanese Official Gazette, Tokukaihei No. 10-177286, publishing date: Jun. 30, 1998)

According to the technique disclosed in these publications, an image of a first color and an image of a second color are formed respectively on two photosensitive bodies, and transferred sequentially onto an immediate transfer belt. Then, an image of a third color and an image of a fourth color are formed respectively on the two photosensitive bodies, and transferred sequentially onto the intermediate transfer belt. Finally, an image formed on the intermediate transfer belt is transferred onto a paper, whereby a color image is formed on the paper.

Incidentally, an image forming apparatus which forms a composite image by superimposing a particular pattern on a monochrome image can adopt any of the foregoing multi-rotation process method, tandem method, and double-photosensitive-body method.

However, combinations of the foregoing arrangement such that gives a particular pattern to a monochrome image with the foregoing adoptable methods to the image forming apparatus have not been fully discussed. Thus, some combinations may cause a new problem that the printing time required for a monochrome copy image is extended undesirably by giving a particular pattern to the monochrome copy image depending on the selected method.

Further, a particular pattern to be superimposed on a monochrome copy image of a monochrome original is not necessarily a full-color image, and there may be a case where such a particular pattern is a monocolor other than black, that is, merely a dichromatic copy image of black and one more different color has to be formed. However, such a case has not been concerned at all.

In addition, the foregoing technique of producing a composite image with the trace pattern was devised only for a color image, and the use for a monochrome image has not been discussed. However, in practice, besides the color images including securities, paper money, etc., prohibition against unauthorized duplication should be also concerned for documents of secret information. Therefore, a mode to superimpose a trace pattern on a monochrome image should be also provided while maintaining a printing rate as fast as a monochrome image printing rate.

SUMMARY OF THE INVENTION

The present invention was devised to solve the above problems, and therefore, has an object to provide a compact and inexpensive color image forming apparatus which can produce a composite image by superimposing a particular pattern on a part of a monochrome image, or which can superimpose a trace pattern of identification information for identifying a particular device while maintaining the printing rate as fast as the monochrome image printing rate.

In order to achieve the above object, the applicant has discussed possible combinations of arrangements such that give a particular pattern to a monochrome image with the methods adoptable to the image forming apparatus, and selected the double-photosensitive-body method. Further, in addition to an image forming processing unit that forms a monochrome image, another image forming processing unit is provided so that the particular pattern is formed by this additional image forming processing unit. Consequently, the applicant discovered that the above arrangement can solve the problem that the printing time for a monochrome image is extended undesirably when giving the particular pattern to the monochrome image.

In other words, a color image forming apparatus of the present invention is furnished with:
  a first image processing unit and a second image processing unit, each having,
    a photosensitive body,
    a laser scanner unit for forming an electrostatic latent image by exposing a surface of the photosensitive body, and
    a plurality of developing devices for supplying the electrostatic latent image with toner,
      each of the plurality of developing device withholding toner of a different color provided that one of the plurality of developing devices in the first image processing unit withholds black toner,
      a color image being formed by transferring toner images formed on the photosensitive bodies in the first and second image processing units so as to be superimposed over one another;
  an additional information composite section for producing a composite image by combining a chief monochrome image with additional information, the additional information forming an image different from the chief monochrome image; and
  a CPU for having the first image processing unit form the chief monochrome image and the second image processing unit form the image of the additional information.

According to the above arrangement, two image processing units, that is, the first and second image processing units are provided, and when the additional information is combined with a chief monochrome image in a color other than black to produce a composite image, the first image processing unit forms the chief monochrome image and the second image processing unit forms the image of the additional information. Consequently, a copy image of the original image and the image of the additional information can be formed simultaneously.

Hence, by forming the monochrome image and image of the additional information simultaneously, the problem that the printing time is extended by forming the image of the additional information can be solved. In other words, a composite image of a monochrome image with a color image of the additional information other than black can be formed as short as the time necessary to form a monochrome image alone.

In contrast, in case that the multi-rotation process method is selected, the number of steps in the image forming process is increased invariably to form an image of the particular pattern in any color other than black, thereby undesirably extending the time required to form a monochrome image.

In case that the tandem method is selected, the apparatus is undesirably upsized and becomes more expensive. Further, because an additional image forming station is necessary to form a particular pattern, a technique such that accelerates the processing rate only when forming a monochrome image can not be adopted easily, thereby extending the time required to form a monochrome image after all.

Thus, the above arrangement makes it possible to provide a color image forming apparatus which can produce a composite image of a copy of an original image with additional information of a different color while maintaining a printing rate as fast as the monochrome printing rate without increasing the size and costs of the apparatus.

The additional information referred to herein includes, for example, a particular pattern exhibiting the nature of a document, a trace pattern exhibiting identification information for identifying a particular device, a pattern image, such as electronic information of characters, images, voices, etc. in the form of bar codes.

The color image forming apparatus of the present invention is preferably arranged in such a manner that:
  the additional information is identification information which identifies a particular device; and
  the additional information composite section produces the composite image by combining the identification information with the chief monochrome image.

According to the above arrangement, the additional information is identification information for identifying a particular device. In other words, a composite image of a monochrome image and the identification information identifying a particular device can be produced while maintaining a printing rate as fast as the monochrome image printing rate. Consequently, the device which has printed out an image in question can be identified even when such an image is a monochrome image.

In order to reduce a visual change in the printed image, the identification image for identifying a particular device is preferably formed in an almost unnoticeable color to human eyes, such as yellow.

The color image forming apparatus of the present invention is preferably arranged in such a manner that the CPU has the plurality of developing devices in the second image processing unit operate simultaneously for an electrostatic latent image of the additional information to form the image of the additional information.

According to the above arrangement, an electrostatic latent image formed in the second image processing unit is developed by operating a plurality of developing devices withholding toners of different colors simultaneously. Consequently, the additional information can be printed out not only in a primary color but also a color obtained only by mixing the primary colors while maintaining a printing rate as fast as the monochrome image printing rate. For example, additional information can be printed out in red by using toners of two different colors, that is, yellow and magenta toners, green by using yellow and cyan toners, and blue by using magenta and cyan toners. Consequently, the additional information can be printed out in a color selected from a wider variety of colors.

The color image forming apparatus of the present invention is preferably arranged in such a manner that, of all the plurality of developing devices in the second image processing unit, a developing device withholding a lighter color is positioned in an upstream in a direction in which the photosensitive body rotates.

In case an electrostatic latent image formed on one photosensitive body is developed by using a plurality of developing devices, in particular, in case that toners of a plurality of colors are supplied to one electrostatic latent image, the toner supplied to the photosensitive body from the developing device provided in the upstream in the direction in which the photosensitive body rotates may enter into another developing device provided in the downstream. In case that toners of a plurality of colors are supplied to one electrostatic latent image as has been discussed, the possibility of such blending is quite high.

Here, if toner of a light color goes into the toner of a dark color, the adverse effect is negligible, but if toner of a dark color goes into the toner of a light color, the adverse effect is noticeable.

Thus, in the above arrangement, the developing device withholding toner of a lighter color is provided in the upstream in the direction in which the photosensitive body rotates. Accordingly, toner of a dark color will not enter into the developing device withholding toner of a lighter color, thereby preventing deterioration of image quality caused by such unwanted color blending.

For example, if the developing devices in the second image processing unit withhold color toners of yellow and magenta or yellow and cyan, the developing device withholding yellow toner is provided in the upstream in either combination.

The color image forming apparatus of the present invention is preferably arranged in such a manner that, of all the plurality of developing devices, developing devices withholding the black toner and at least one of color toners used for forming the image of the additional information have a larger toner capacity than a rest of the plurality of developing devices.

According to the above arrangement, the developing devices withholding the black toner and at least one of color toners used in producing a composite image of the monochrome image with the additional information have a larger toner capacity. When the color of the additional information is limited, that is, when the additional information is the identification information for identifying a particular device, the above arrangement is particularly effective.

For example, in case that yellow toner is used when the identification information is given, the yellow toner is consumed more than the toners of other colors used only for printing out a color image.

Thus, by providing a larger toner capacity to the developing devices withholding the black toner and the toner used in combining the additional information in the above manner, the toner replenishing cycle or the frequency for toners of all the colors can be substantially the same, thereby improving the maintenance efficiency of the apparatus.

In case of the above example, a relation of the toner capacities of the developing devices can be expressed as: black$\leq$yellow>magenta=cyan.

The color image forming apparatus of the present invention is preferably arranged in such a manner that, of all the plurality of developing devices, a developing device withholding the black toner has a largest toner capacity, and a rest of the plurality of developing devices are of an identical structure.

According to the above arrangement, the developing devices withholding the toners other than black, that is, yellow, magenta, and cyan, are of the same structure, and therefore, interchangeable. If the developing devices withholding the color toners other than black are interchangeable, the toner colors provided in the second image processing unit can be changed as necessary, thereby giving a wider variety of colors to the additional information.

In addition, because the toner capacity of the developing device withholding the black toner is larger than that of the rest of the developing devices, the toner replenishing cycle or the frequency for toners of all the colors can be substantially the same, thereby improving the maintenance efficiency of the apparatus.

For a fuller understanding of the nature and advantages of the invention, reference should be made to the ensuing detailed description taken in conjunction with the accompanying drawings.

DESCRIPTION OF THE EMBODIMENTS

Figure 1:
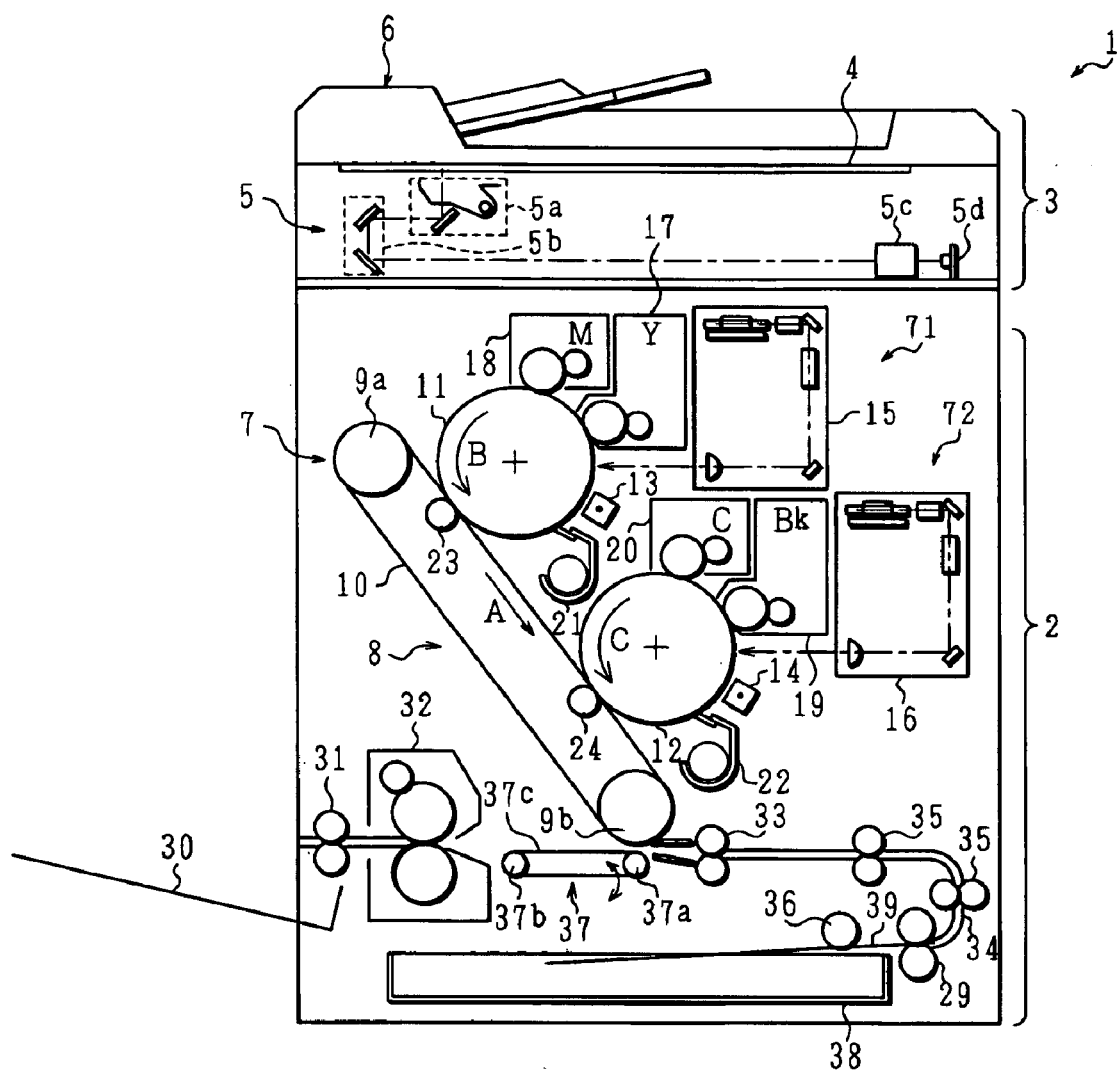
FIG. 1 is a view showing an entire digital color copying machine as a color image forming apparatus in accordance with one embodiment of the present invention.
Figure 2:
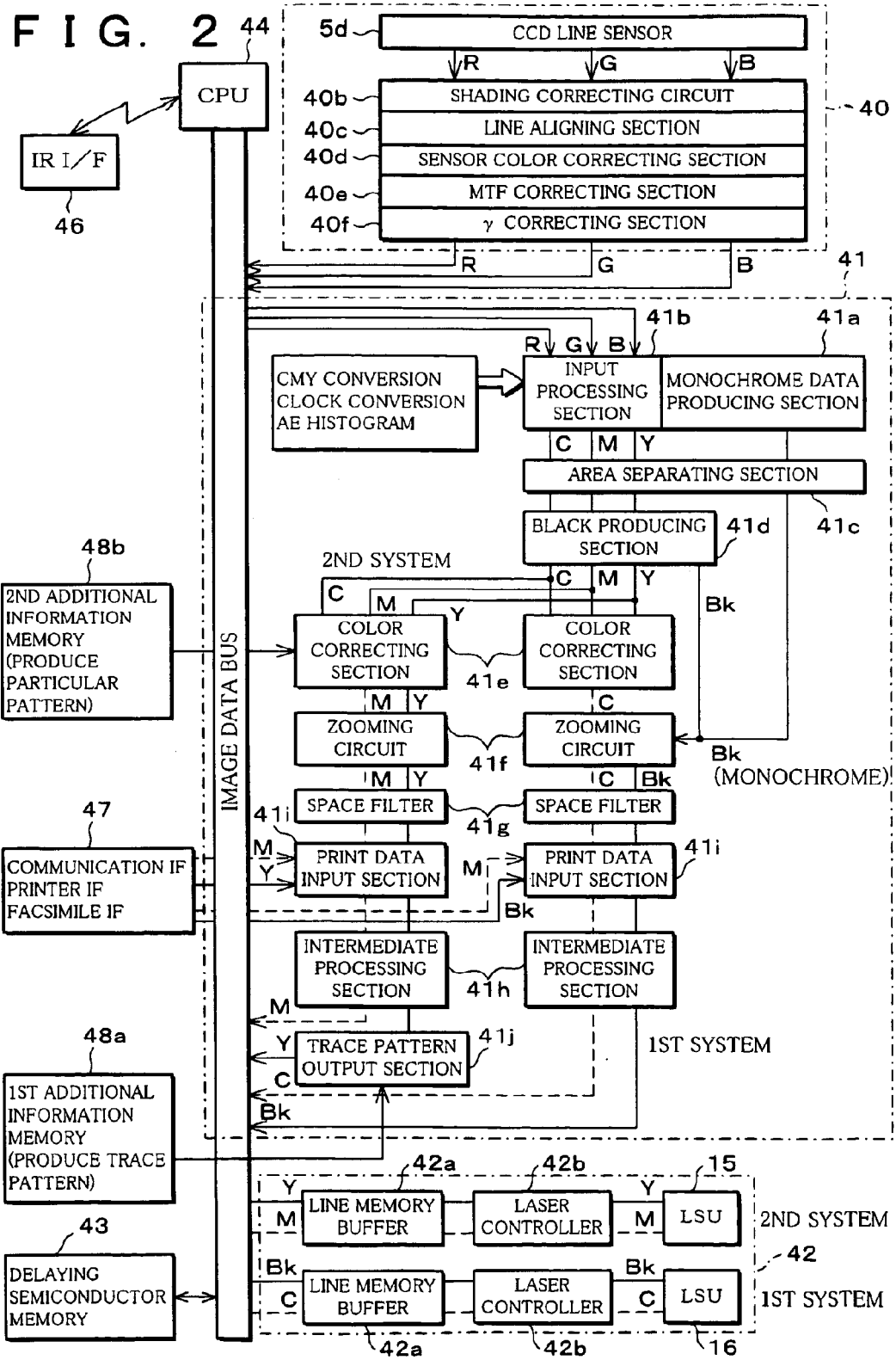
FIG. 2 is a block diagram depicting an arrangement of an image processing unit in the digital color copying machine of FIG. 1.
Figure 3:
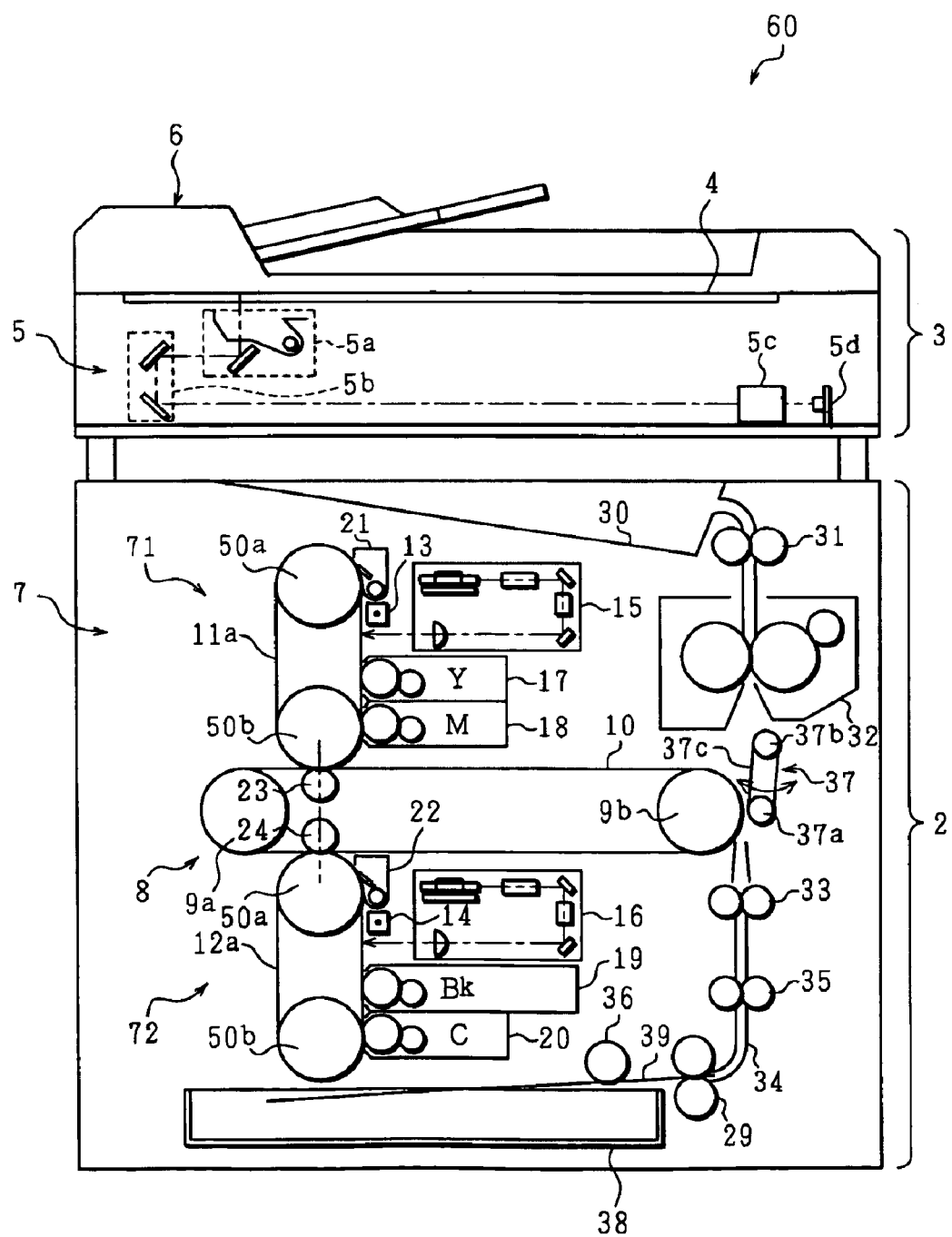
FIG. 3 is a view showing an entire digital color copying machine as a modified color image forming apparatus of the present invention.

Referring to FIGS. 1 through 3, the following description will describe one embodiment of the present invention.
(1) Arrangement of Apparatus FIG. 1 is a view showing an entire digital color copying machine 1 as a color image forming apparatus in accordance with one embodiment of the present invention, and schematically shows an internal arrangement seen from the front. The digital color copying machine 1 mainly comprises a main body 2 and a scanner unit 3 placed on top of the main body 2.

The arrangement of the scanner unit 3 will be explained first. The scanner unit 3 includes a document table 4 on which an original (document) is placed. An image on the original placed on the document table 4 is read by a reading optical system 5 provided below the document table 4 and converted into an electric signal. The reading optical system 5 includes a first scanning unit 5a and a second scanning unit 5b which move back and forth along the document placing surface of the document table 4, an optical lens 5c, and a CCD line sensor 5d composed of a photoelectric converting element.

The first scanning unit 5a includes an exposing lamp which exposes the surface of the original, and a first mirror which reflects a reflect light image from the original to a particular direction. The first scanning unit 5a moves back and forth along the document placing surface of the document table 4 at a predetermined scanning rate while keeping a certain space from the document placing surface.

The second scanning unit 5b includes second and third mirrors which further reflect the reflect light image of the original which has been reflected by the first mirror in the first scanning unit 5a. The second scanning unit 5b moves back and forth along the document placing surface of the document table 4 in association with the movement of the first scanning unit 5a in terms of scanning rate.

The optical lens 5c forms a reduced reflection light image of the original document reflected from the third mirror in the second scanning unit 5b at a predetermined position on the CCD line sensor 5d by converging the same.

The CCD line sensor 5d photoelectrically converts the light image thus formed into an electric signal, and outputs the same. The CCD line sensor 5d is a triple-line color CCD which can read a monochrome image or a color image, and output line data as the result of color separation into R (Red), G (Green), and B (Blue). The original image data converted into the electric signal by the CCD line sensor 5d is transferred to an image processing unit described below, where predetermined image data processing is effected.

The digital color copying machine 1 includes a RADF (Reversing Automatic Document Feeder) 6 placed on top of the scanner unit 3. The RADF 6 is attached to the top of the scanner unit 3 in such a manner that it can be opened and closed with respect to the document table 4 while keeping a predetermined alignment with respect to the document placing surface thereof.

The RADF 6 feeds an original to the document table 4, so that one surface thereof opposes the reading optical system 5 at a predetermined position, and turns over the original when the reading of the image on that surface is completed. Then, the RADF 6 transports the original to the document table 4 in the same manner, so that the other surface thereof opposes the reading optical system 5.

When images on the both surfaces of the 1-page original have been read, the RADF 6 releases the original and starts to feed the next original. It should be appreciated that the feeding and document reversing actions of the RADF 6 are controlled in association with the operation of the digital color copying machine 1 as a whole.

Next, the following will explain the main body 2. The main body 2 encloses an image forming section 7, and is provided with an unillustrated manipulation panel on the top thereof.

The image forming section 7 is provided with a tilted belt unit 8. The belt unit 8 is composed of a pair of tension rollers 9a and 9b, and an intermediate transfer belt 10 looped over the same, so that the intermediate transfer belt 10 rotates in a direction indicated by an arrow A. Two photosensitive bodies 11 and 12 respectively forming two image process units 71 and 72 are provided diagonally above the tilted belt unit 8. Each of the photosensitive bodies 11 and 12 is a drum.

Of the two photosensitive bodies 11 and 12, the photosensitive body 11 provided in the upstream of the intermediate transfer belt 10 constitutes a second image process unit 71 responsible for forming images of two colors: yellow (Y) and magenta (M), and rotates in a direction indicated by an arrow B. The photosensitive body 11 is surrounded with a charger 13, a laser scanner unit serving as an exposing device (exposing means, hereinafter, referred to as LSU) 15, developing devices 17 and 18, and a cleaning device 21, which altogether constitute the second image process unit 71.

The charger 13 charges the photosensitive body 11 across the surface, and the LSU 15 forms an electrostatic latent image on the surface of the photosensitive body 11 by exposing the surface based on image data sent from the image processing unit described below. The cleaning device 21 removes residual toner on the photosensitive body 11 before it is charged by the charger 13.

The developing devices 17 and 18 are devices which develop the electrostatic latent image formed on the photosensitive body 11 into a visible image with a developer (toner). The developing devices 17 and 18 withhold a yellow developer and a magenta developer, respectively. Here, the developing device 17 withholding the yellow developer is positioned in the upstream from the developing device 18 withholding the magenta developer along a direction in which the photosensitive bodies 11 and 12 rotate.

The LSU 15 is composed of a semiconductor laser element for emitting dot light modulated in accordance with the image data, a polygonal mirror for scanning a laser beam emitted from the semiconductor laser element in a main scanning direction, and a fθ lens and a mirror for converging a scanned laser beam and thereby forming an image on the surface of the photosensitive body 11. The LSU 15 forms an electrostatic latent image of yellow and an electrostatic latent image of magenta.

On the other hand, the photosensitive body 12 provided in the downstream of the intermediate transfer belt 10 constitutes a first image process section 72 which forms images in two colors: black (Bk) and cyan (C), and rotates in a direction indicated by an arrow C. Like the photosensitive body 11, the photosensitive body 12 is also surrounded with a charger 14, a laser scanner unit (exposing means, hereinafter, referred to as LSU) 16 for forming electrostatic latent images of black and cyan, a developing device 19 withholding a black developer, a developing device 20 withholding a cyan developer, and a cleaning device 22 which altogether constitute the first image process unit 72.

It should be noted that the developing device 17 withholding the yellow developer and the developing device 19 withholding the black developer have larger toner capacity than their respective corresponding developing devices 18 and 20.

The developing devices 17, 18, 19 and 20 adopt a non-contacting developing method, by which an image is developed without physically contacting the photosensitive body 11 or 12. However, in case that no additional information (additional image) is superimposed by providing a single electrostatic latent image with a plurality toners of different colors (this will be described in detail below), a contacting developing method may be adopted, by which an image is developed with physical contact to the photosensitive body 11 or 12. However, the non-contacting developing method is more preferable than the contacting developing method in terms of costs and design flexibility, because in case of the contacting developing method, mechanism for removing/pressing the developing devices 17, 18, 19, and 20 from/against the photosensitive body 11 or 12, and mechanism like a shutter for replenishing/discharging the developer to/from the developing devices 17, 18, 19 and 20 are additionally necessary.

First transfer devices 23 and 24 are provided inside the loop of the intermediate transfer belt 10 at opposing positions to the photosensitive bodies 11 and 12, respectively. The first transfer devices 23 and 24 transfer toner images formed on the photosensitive bodies 11 and 12 onto the intermediate transfer belt 10 serving as a transfer body.

A transfer and transport member 37 is provided below the belt unit 8 at an opposing position to the tension roller 9b, whereby the toner image on the surface of the intermediate transfer belt 10 is transferred onto a paper 39 fed from a paper cassette 38 described below as the paper 39 is transported further.

The transfer and transport member 37 is composed of a roller of a second transfer device 37a, a tension roller 37b, and a transportation belt 37c looped over the second transfer device 37a and roller 37b. The transfer and transport member 37 can be spaced apart from or pressed against the intermediate transfer belt 10 at the second transfer device 37a side with respect to the tension roller 37b. The transfer and transport member 37 presses the second transfer device 37a side against the surface of the intermediate transfer belt 10 only when a toner image is transferred from the intermediate transfer belt 10 onto the paper 39.

Although it is not shown in FIG. 1, a cleaning device is provided in the downstream from the pressing position of the transfer and transport member 37 in a direction in which the intermediate transfer belt 10 is turned, so that the surface of the intermediate transfer belt 10 is cleaned after the toner image has been transferred.

The paper cassette 38 withholding papers 39 as transfer materials is provided below the image forming section 7. The paper cassette 38 is furnished with a pick-up roller 36 and a pair of feeding rollers 29 for feeing papers 39 withheld therein. Each paper 39 fed from the cassette 38 is transported along a paper guide 34 by a pair of feeding rollers 35. A pair of resist rollers 33 for timing the transfer in such a manner that a toner image position on the intermediate transfer belt 10 matches with a corresponding position on the paper 39 is provided in the preceding stage of the transfer and transport member 37.

A fusing device 32 for fusing and fixing the toner image transferred from the transfer and transport member 37 onto the paper 39 is provided in front of the transfer and transport member 37, and a pair of releasing rollers 31 for releasing the paper 39 which has been passed through the fusing device 32 are provided in front of the transfer and transport member 37. Also, a released paper tray 30 for receiving the released paper 39 from the releasing rollers 31 is provided at the side face of the main body 2.

(2) Arrangement of Image Processing Unit

The following will explain the image processing unit with reference to FIG. 2. FIG. 2 is a block diagram depicting an arrangement of the image processing unit.

The image processing unit comprises an image data input section 40, an image data processing section (additional information forming means) 41, an image data output section 42, a central processing unit (control means, additional information composite means, hereinafter, referred to as CPU) 44, an external interface section 46, a built-in interface section 47, first and second additional information memories (additional information composite means) 48a and 48b, and a delaying semiconductor memory 43.

The image data input section 40 is composed of a CCD line sensor 5d, a shading correcting circuit 40b, a line aligning section 40c, a sensor color correcting section 40d, an MTF correcting section 40e, and a γ correcting section 40f.

The CCD line sensor 5d reads a monochrome or color original image and outputs triple-line data as the result of color separation into color components: red (R), green (G), and blue (B). The shading correcting circuit 40b corrects a line image level of the line data outputted from the CCD line sensor 5d. The line aligning section 40c is composed of a line buffer, etc. and corrects displacement in the line data. The sensor color correcting section 40d corrects color data of the line data. The MTF correcting section 40e corrects a signal from each pixel in the CCD line sensor 5d, so that the signal will be well modulated. The γ correcting section 40f corrects visibility by correcting luminance of an image.

The image data processing section 41 is composed of a monochrome data producing section 41a (for monochrome original image), an input processing section 41b, an area separating section 41c, a black producing section 41d, a color correcting circuit 41e, a zooming circuit 41f, a space filter 41g, an intermediate processing section 41h, a print data input section 41i, and a trace pattern output section 41j.

The monochrome data producing section 41a produces monochrome data from a RGB signal, namely a color image signal inputted from the image data input section 40. The input processing section 41b converts the RGB signal into a YMC signal compatible to the image forming section 7 (see FIG. 1) enclosed in the digital color copying machine 1, and effects clock conversion and AE histogram processing.

The area separating section 41c determines whether the input image data is a text, a dot picture, or a photographic paper picture, and separates the data into corresponding areas. The black producing section 41d produces a black portion in the color image by removing a background color based on the YMC signal outputted from the input processing section 41b.

The color correcting circuit 41e adjusts each color in the color image signal based on each color conversion table. The zooming circuit 41f and space filter 41g magnifies the input image information based on a predetermined magnification. The intermediate processing section 41h confers gradation by means of multi-value error diffusion or multi-value dither.

The print data input section 41i provided between the space filter 41g and intermediate processing section 41h is an input section of print data inputted from the built-in interface section 47 described below. The print data input section 41i produces a composite image of the YMC signal which has been processed sequentially by the color correcting circuit 41e, zooming circuit 41f, and space filter 41g with the print data inputted from the built-in interface section 47.

The trace pattern output section 41j produces a composite image of a print image with trace pattern which is the identification information to identify a particular apparatus to prevent forgery. The trace pattern should be an image of an almost unnoticeable color to human eyes, and yellow is used in general. For this reason, the trace pattern output section 41j is provided on a line for processing yellow image data.

The zooming circuit 41f, space filter 41g, intermediate processing section 41h, and print data input section 41i provided in the downstream of the color correcting circuit 41e are divided into two systems for the LSUs 15 and 16, respectively. In FIG. 2, the system in the left side corresponds to the LSU 15 and serves as a second system (image data line) including the yellow line, while the system in the right side corresponds to the LSU 16 and serves as a first system (image data line) including a black line.

In other words, of all the image data for the original image, image data for the toner images of the corresponding colors are selectively sent to the first image process unit 72 and second image process unit 71 through the image data lines in the first and second systems.

The image data output section 42 comprises a line memory buffer 42a and a laser controller 42b for each of the first and second systems in the image data processing section 41, and two LSUs 15 and 16 corresponding to these two systems.

The line memory buffer 42a adjusts output timing of image data of each color sent from the intermediate processing section 41h. The laser controller 42b modulates a pulse width of image data of each color sent from the intermediate processing section 41h. Each of the LSUs 15 and 16 records data on the photosensitive bodies 11 and 12 by means of laser beams based on the pulse width modulated signal in response to the image data of each color outputted from their respective laser controllers 42b.

In case of a color original document, the LSU 15 serving as the second system records data by using laser beam in the form of a pulse modulated signal in response to the image data of yellow in the first scanning in the image data input section 40. In the second scanning, the LSU 15 records data by using a laser beams in the form of a pulse modulated signal in response to the image data of magenta. On the other hand, the LSU 16 serving as the first system records data by using a laser beam in the form of a pulse modulated signal in response to the image data of black in the first scanning in the image data input section 40. In the second scanning, the LSU 16 records data by using a laser beam in the form of a pulse modulated signal in response to the image data of cyan. Thus, the electrostatic latent image is formed as a result of the foregoing recording by using the laser beams.

The delaying semiconductor memory 43 is provided to prevent displacement of the image forming position between the two image processing units 72 and 71 (see FIG. 1) of the first and second systems. The image data of each color is stored in the delay semiconductor memory 43 temporarily, and exposure start timing is adjusted by sensing the image data to the LSUs 15 and 16 with time being adjusted separately. Consequently, the positions of images to be transferred onto the intermediate transfer belt 10 from the photosensitive bodies 11 and 12 are matched.

The CPU 44 controls the image data input section 40, image data processing section 41, image data output section 42, external interface section 46 described below, built-in interface section 47, first and second additional information memories 48a and 48b, and delaying semiconductor memory 43 based on a predetermined sequence.

The external interface section 46 is a communication interface means for receiving image data from an external image input processing device different from the digital color copying machine 1 (for example, a communication portable terminal, a digital camera, a digital video camera, etc.). The image data inputted from the external interface section 46 is inputted into the image data processing section 41 and processed in various manners, and thereby converted to data to be processed by the image forming section 7 in the digital color copying machine 1. Thereafter, the converted image data is outputted to the image data output section 42 in the same manner described above.

Further, the built-in interface section 47 is a printer interface for inputting image data produced by a personal computer or the like. The built-in interface section 47 is a monochrome/color facsimile interface for receiving image data sent through a facsimile machine. Here, the image data inputted from the built-in interface section 47 is assumed to have been converted into a CMYK signal, and for this reason, the input image data is combined in the halfway of the operation of the image data processing section 41, processed by the intermediate processing section 41h, and outputted to the image data outputting section 42.

The first additional image memory 48a stores a trace pattern (additional image data) serving as an identification signal for identifying a particular device to prevent forgery. The image data forming the trace pattern is inputted not into the first system for forming a black image, but into the trace pattern output section 41j in the other second system. Because the trace pattern is preferably unnoticeable, the trace pattern is developed into a visible image with yellow toner. Thus, in case of a color print, the trace pattern is combined with the image data of yellow in the original image, and in case of a monochrome print, additional image data of yellow is outputted.

The second additional information memory 48b stores companies' logos and particular patterns (additional image data) of predetermined images, such as "CONFIDENTIAL" and "URGENT". The image data is inputted into the second additional information memory 48b not from the first system for forming a black image, but from the zooming circuit 41f in the other second system.

In case of the digital color copying machine 1 of the present embodiment, the user can select the color of these particular patterns from three colors: yellow, magenta, and red. When the user selects red, the electrostatic latent image based on the second additional information memory 48b is developed into a visible image with both the yellow toner and magenta toner. However, in case that the trace pattern should be given to the monochrome print, the particular pattern is formed in the same color as the color of the trace pattern, that is, yellow. Therefore, in case of a color print, the particular pattern is combined with the image data of the same color in the original image, and in case of the monochrome print, an image data is outputted as the data of a newly designated color.

Here, the first additional information memory 48a, second additional information memory 48b, CPU 44, and image data processing section 41 constitute an additional information composite section, that is, additional information composite means.

(3) Color Image Forming Action

The following will explain operations of the above-arranged digital color copying machine 1 when forming a color image with reference to FIGS. 1 and 2. The following will explain a case where a composite image of a color image and the trace pattern and particular pattern is formed. When forming a color image, the trace pattern is constantly superimposed almost in any case and the particular pattern is superimposed only when the user wishes so.

The reading optical system 5 reads an original image by repeating scanning twice in total. The original image read in the first scanning is delivered to the DDC line sensor 5d through the optical lens 5c and a light image of the same is formed. The CCD line sensor 5d photoelectrically converts the light image thus formed into an image signal of R, G, and B, and sends the same to the image processing unit in FIG. 2.

The image processing unit effects the foregoing various kinds of image processing to the original image data. A laser beam modulated based on the image data of yellow is emitted from the LSU 15 serving as the second system in the image data output section 42. On the other hand, a laser beam modulated based on the image data of black is emitted from the LSU 16 serving as the first system. The LSUs 15 and 16 write data synchronously. In case that a command to give the trace pattern and particular pattern to the original image data is issued, the particular pattern is combined with the image data of yellow.

The surface of each of the photosensitive bodies 11 and 12 is charged uniformly as it passes by an opposing position to the charger 13/14, and by emitting laser beams from the LSUs 15 and 16 to the charged surface, an electrostatic latent image of yellow and an electrostatic latent image of black are formed respectively on the photosensitive bodies 11 and 12.

Then, the electrostatic latent image of yellow on the photosensitive body 11 is developed into a visible image of yellow as it passes by an opposing position to the developing device 17, and transferred onto the intermediate transfer belt 10 by means of the first transfer device 23.

On the other hand, the electrostatic latent image of black on the photosensitive body 12 is developed into a visible image of block as it passes by an opposing position to the developing device 19, and transferred onto the intermediate transfer belt 10 by means of the first transfer device 24.

In other words, the intermediate transfer belt 10 is a layering section where toner images formed in the first image processing unit 72 and second image processing unit 71 are layered over one another.

As has been discussed, the write timing of an image on the photosensitive bodies 11 and 12 is controlled by the delaying semiconductor memory 43, and the toner image of yellow and the toner image of black are transferred at the superimposing position on the intermediate transfer belt 10 without causing any displacement from each other. At this point, the transfer and transport member 37 is spaced apart from the intermediate transfer belt 10.

After the toner of each color formed on the surface is transferred onto the intermediate transfer belt 10, each of the photosensitive bodies 11 and 12 is cleaned by the corresponding cleaning device 21 or 22. Also, charges remaining on each of the photosensitive bodies 11 and 12 are removed by an unillustrated eraser as necessary, and the image processing unit becomes ready for the next image forming action.

Then, the reading optical system 5 carries out the second scanning in the same manner as the developing device 18 in the second image processing unit 71 and the developing device 20 in the first image processing unit 72. In the second scanning, an electrostatic latent image first and then a toner image of magenta is formed on the photosensitive body 11 and an electrostatic latent image first and then a toner image of cyan is formed on the photosensitive body 12 in the same manner as above. Subsequently, each toner image is transferred onto the intermediate transfer belt 10. In case that a command to give the particular pattern is issued, the particular pattern is combined with the magenta image data of the original image data.

Here, the toner image of magenta is transferred so as to be superimposed on the already transferred toner images of yellow and black. Also, the toner image of cyan is transferred so as to be superimposed on the already transferred toner images of yellow, black, and magenta, whereby a quadruple-layer image composed of four color layers is formed on the surface of the intermediate transfer belt 10.

Here again, after the toner of each color formed on the surface is transferred onto the intermediate transfer belt 10, each of the photosensitive bodies 11 and 12 is cleaned by the corresponding cleaning device 21 or 22, and charges remaining on each of the photosensitive bodies 11 and 12 are removed by an unillustrated eraser as necessary.

In this manner, the quadruple-layer image composed of four superimposed images on the intermediate transfer belt 10 is transported to near the transfer and transport material 37 as the intermediate transfer belt 10 turns, and transferred onto the paper 39 fed from the paper cassette 38 upon passing an opposing position to the transfer and transport member 37 by means of the second transfer device 37a.

Subsequently, the paper 39 on which the quadruple-layer image has been transferred is transported further to the fusing device 32 by the transfer and transport member 37. The image transferred onto the paper 39 is fused and fixed onto the paper 39, thereby forming a color image. Subsequently, the paper 39 is released on the released paper tray 30 by the pair of paper releasing rollers 31.

(4) Monochrome Image Forming Operation

Next, the following will explain operations of the digital color copying machine 1 when forming a monochrome image.

An image read by scanning of the reading optical system 5 is reproduced as a light image on the CCD line sensor 5d through the optical lens 5c. The CCD line sensor 5d converts the light image photoelectrically into image signals of R, C, and B, and sends the same to the image processing unit of FIG. 2.

As the image processing unit effects the foregoing various kinds of image processing, laser beams modulated based on the image data are emitted respectively from the LSUs 15 and 16 in the image data output 42 at predetermined emitting start timing adjusted by the delaying semiconductor memory 43.

More specifically, the LSU 16 serving as the first system emits a laser beam modulated based on the image data of black for reproducing the original image.

On the other hand, in case that a command to give the trace pattern is issued, the LSU 15 serving as the second system emits a laser beam modulated based on the image data for forming the trace pattern outputted from the trace pattern output section 41j. In case that a command to give the particular pattern is issued, the LSU 15 emits a laser beam modulated based on the image data for forming the particular pattern outputted from the second additional information memory 48b and inputted to the zooming circuit 41f.

Meanwhile, the surface of each of the photosensitive bodies 11 and 12 is charged uniformly as it passes by an opposing position to the charger 13/14 while it turns in the direction indicated by arrow B/C. By irradiating the laser beams from the LSUs 15 and 16 to the charging surfaces, the electrostatic latent image of either or both of the trace pattern and particular pattern is formed on the photosensitive body 11, and the electrostatic latent image is developed on the other photosensitive body 12 as a black toner image of the original image.

The electrostatic latent image of either or both of the trace pattern and particular pattern is turned into a visible image as it passed by an opposing position to the developing device of yellow or magenta whichever is designated, thereby forming a toner image of the designated color. The toner image thus formed is transferred onto the intermediate transfer belt 10 at an opposing position to the same by the first transfer device 23.

In case that red is designated as the color of the particular pattern, both the yellow toner and magenta toner are supplied from the developing devices 17 and 18, respectively, and a double-layer toner-image is formed on the photosensitive body 11, which is transferred onto the intermediate transfer belt 10. Thus, the particular pattern is formed as a composite image of two kinds of toner images.

Here, because the electrostatic latent image of yellow is developed into the toner image earlier than that of magenta, that is, the magenta toner is supplied onto the toner image of yellow. Thus, given −400V as the developing bias of the electrostatic latent image of yellow, then a greater voltage, approximately −500V is given as the developing bias of the electrostatic latent image of magenta, whereby an image of red can be formed in a allowable range.

Likewise, the electrostatic latent image of black on the photosensitive body 12 is turned into a visible black toner image as it passes by an opposing position to the developing device 19, and transferred onto the intermediate transfer belt 10 by the first transfer device 24.

As has been discussed, the image writing timing with respect to the photosensitive bodies 11 and 12 is controlled by the delaying semiconductor memory 43. Thus, the toner images are sequentially superimposed over one another on the intermediate transfer belt 10 without causing any displacement.

The toner images transferred onto the intermediate transfer belt 10 in the above manner are transported to near the transfer and transport member 37 as the intermediate transfer belt 10 turns, and transferred again onto a paper 39 fed from the paper cassette 38 by the second transfer device 37a in the transfer and transport member 37 when it passes an opposing position to the transfer and transport member 37.

Subsequently, the paper 39 on which the image has been transferred is transported to the fusing device 32, where the transferred image is fused and fixed onto the paper 39. Then, the paper 39 is released onto the released paper tray 30 by the pair of paper releasing rollers 31.

As has been discussed, the digital color copying machine 1 is arranged to include two image processing units: one (first image processing unit 72) is provided with the photosensitive body 11 and used exclusively in forming a monochrome image, and the other (second image processing unit 71) is provided with the photosensitive body 12 and used exclusively in forming the particular pattern or trace pattern. According to this arrangement, the particular pattern or trace pattern can be added to a monochrome image while maintaining a print rate as fast as the monochrome image printing rate.

The above arrangement is preferably arranged further in such a manner that toner capacities in the developing devices 17 and 19 withholding yellow and black toners are lager than those in the other developing devices 18 and 20, because the yellow and black toners are consumed more than the toners of the other colors. Consequently, toners of all the colors are replenished at the same cycle or at the same frequency, thereby improving the maintenance efficiency.

In addition, the digital color copying machine 1 is arranged in such a manner that both the developing devices 17 and 18 withholding the yellow and magenta toners in the second image processing unit 71 are operated for a single electrostatic latent image to form the particular pattern. Thus, the particular pattern can be printed not only in a primary color of yellow or magenta, but also in a color obtained only by adding (blending) two primary colors, such as red. Further, in case that the particular pattern should be added, the print rate can be maintained at the same print rate as fast as the monochrome printing rate.

Furthermore, according to the above arrangement, the developing device 17 withholding yellow is positioned in the upstream in the direction in which the photosensitive body 11 rotates. Thus, even if the two developing devices 17 and 18 are operated simultaneously, the above arrangement prevents the magenta toner from being blended with the yellow toner which is readily mixed with another color.

(5) Modification

Next, with reference to FIG. 3, the following will explain the arrangement of a digital color copying machine 60 as a modification of the present embodiment. FIG. 3 is a view showing the entire digital color copying machine 60 as a color image forming apparatus in accordance with a modification of the present embodiment, and schematically shows an internal arrangement seen from the front. Hereinafter, like components are labeled with like reference numerals with respect to the digital color copying machine 1 of FIG. 1, and the description of these components is not repeated for ease of explanation.

The digital color copying machine 60 of FIG. 3 includes belts of photosensitive bodies 11a and 12a, each of which being looped over rollers 50a and 50b. The paper guide 34 is provided to a position different from the digital color copying machine 1, that is, it is provided in such a manner that the papers are released onto the released paper tray 30 provided at the top of the main body 2.

The characteristic difference from the digital color copying machine 1 is that all the developing devices 17, 18 and 20 withholding magenta, and cyan toners are of the identical structure, and therefore, interchangeable with each other. Only the developing device 19 withholding the black toner is made larger than the others to secure a larger toner capacity.

According to the above arrangement, the developing devices 17, 18, and 20 withholding yellow, magenta, and cyan are interchangeable, and this arrangement provides a wider variety of colors for the color of the particular pattern. To be more specific, in addition to the foregoing yellow, magenta, and red, the particular pattern can be printed in cyan, green (cyan and yellow), and blue (cyan and magenta). It should be appreciated, however, that a composite image of the trace pattern and copy image can not be produced in this case.

Because the black toner is consumed most greatly, and the developing device of black is made larger to secure a largest capacity, the black toner can be replenished at the same time when the toner of the other colors are replenished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color image forming apparatus comprising:

a first image processing unit and a second image processing unit, each having,
   a photosensitive body,
   exposing means for forming an electrostatic latent image by exposing a surface of said photosensitive body, and
   a plurality of developing devices for supplying said electrostatic latent image with toner, each of said plurality of developing devices withholding toner of a different color provided that one of said developing devices in said first image processing unit withholds black toner, a color image being formed by transferring toner images formed on said photosensitive bodies in said first and second image processing units so as to be superimposed over one another, additional information composite means for producing a composite image by combining a chief monochrome image with additional information, said additional information forming an image different from said chief monochrome image, and control means for having a first image processing unit form said chief monochrome image and said second image processing unit form the image of said additional information, said chief monochrome image and said image of said additional information being formed simultaneously when said chief monochrome image is to be combined with said image of said additional information in a color other than black to produce a composite image.

2. The color image forming apparatus of claim 1, wherein:
said additional information is identification information which identifies a particular device, and
said additional information composite means produces the composite image by combining said identification information with said chief monochrome image.

3. The color image forming apparatus of claim 1, wherein said control means has said plurality of developing devices in said second image processing unit operate simultaneously for an electrostatic latent image of said additional information to form the image of said additional information.

4. The color image forming apparatus of claim 1, wherein, of all of said plurality of developing devices in said second processing unit, a developing device withholding a lighter color is positioned upstream in a direction in which said photosensitive body rotates.

5. The color image forming apparatus of claim 1, wherein, of all of the plurality of developing devices, developing devices withholding the black toner and at least one of color toners used for forming the image of said additional information have a larger toner capacity than the rest of said plurality of developing devices.

6. The color image forming apparatus of claim 1, wherein, of all of said plurality of developing devices, a developing device withholding the black toner has a largest toner capacity, and a rest of said plurality of developing devices are of an identical structure.

7. A color image forming apparatus comprising:
a first image processing unit and a second image processing unit, each having:
a photosensitive body,
an exposing device for forming an electrostatic latent image by exposing a surface of said photosensitive body, and
a plurality of developing devices each supplying said electrostatic latent image with toner of a different color provided that one of said plurality of developing devices in said first image processing unit withholds black toner,
a color image being formed by transferring toner images formed on said photosensitive bodies in said first and second image processing units so as to be superimposed over one another,
an additional information composite section for producing a composite image by combining a chief monochrome image with additional information, said additional information forming an image different from said chief monochrome image, and
a central processing unit for having said first image processing unit form said chief monochrome image and said second image processing unit form the image of said additional information,
said chief monochrome image and said image of said additional information being formed simultaneously when said chief monochrome image is to be combined with said image of said additional information in a color other than black to produce a composite image.

8. The color image forming apparatus of claim 1, wherein said additional image composite means includes an additional information memory for storing said additional information.

9. The color image forming apparatus of claim 1, further comprising an intermediate transfer belt, provided in a position to oppose said photosensitive bodies in each of said first and second image processing units, so that a color image is formed by toner images on said photosensitive bodies that are transferred onto said intermediate transfer belt so as to be superimposed over one another.

10. The color image forming apparatus of claim 1, wherein each of said plurality of developing devices is a non-contacting type which develops the electrostatic latent image formed on the surface of said photosensitive body without physically contacting said photosensitive body.

11. The color image forming apparatus of claim 1, wherein:
one of said plurality of developing devices in said second image processing unit withholds yellow toner; and
said additional information is identification information for identifying a particular device and the image thereof is formed with said yellow toner by said second image processing unit.

12. The color image forming apparatus of claim 11, wherein each of said developing devices withholding the yellow toner and black toner has a larger toner capacity than a rest of said plurality of developing devices.

13. The color image forming apparatus of claim 1, wherein the image of said additional information is formed by combining toners of different colors withheld in said plurality of developing devices in said second image processing unit.

14. The color image forming apparatus of claim 1, wherein an image of said additional information is formed by toner of a color selected from the group consisting of yellow, magenta and cyan.

15. A color image forming apparatus comprising:
first and a second image processing units for forming toner images of different colors, respectively;
a layering section for layering said toner images formed by said first and second image processing units;
image data lines respectively serving as first and second systems, said first and second systems selectively sending image data of respective corresponding colors based on an original image to said first and second image processing units; and
an additional information memory, connected to said image data line serving as said second system, for storing additional image data which forms an image different from said original image and will be combined with said image data sent to said image line serving as said second system to produce a composite image,
said second image processing unit being another image processing unit than said first image processing unit whose one of said plurality of developing devices withholds black toner, and forms said image of said additional image data, and
said original image and said image of said additional image data being formed simultaneously when said original image is a monochrome image and is to be combined with said image of said additional image data in a color other than black to produce a composite image.

16. The color image forming apparatus of claim 15, wherein said second image processing unit forms a yellow toner image.

17. The color image forming apparatus of claim 15, wherein said additional information memory stores image data of identification information for identifying a particular device which has formed said original image.

18. The color image forming apparatus of claim 15, wherein said additional information memory stores image data of a particular pattern as a predetermined image.

19. The color image forming apparatus of claim 1, wherein:

the additional information is a particular pattern exhibiting a nature of a document.

20. The color image forming apparatus of claim 1, wherein:

the additional information is a pattern image which is electronic information of a character, an image, and/or voice, in a form of bar codes.

21. The color image forming apparatus of claim 7, wherein:

the additional information is a particular pattern exhibiting a nature of a document.

22. The color image forming apparatus of claim 7, wherein:

the additional information is a trace pattern exhibiting identification information for identifying a device.

23. The color image forming apparatus of claim 7, wherein:

the additional information is a pattern image which is electronic information of a character, an image, and/or voice, in a form of bar codes.

24. The color image forming apparatus of claim 15, wherein:

the additional information memory stores a particular pattern exhibiting a nature of a document.

25. The color image forming apparatus of claim 15, wherein:

the additional information memory stores a pattern image which is electronic information of a character, an image, and/or voice, in a form of bar codes.

* * * * *